United States Patent
Cragg et al.

(10) Patent No.: US 11,070,717 B2
(45) Date of Patent: Jul. 20, 2021

(54) CONTEXT-AWARE IMAGE FILTERING

(71) Applicant: Adobe Inc., San Jose, CA (US)

(72) Inventors: Michael Cragg, Troy, MI (US); Yue Shen, Pleasanton, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/391,718

(22) Filed: Apr. 23, 2019

(65) Prior Publication Data
US 2020/0344411 A1 Oct. 29, 2020

(51) Int. Cl.
*H04N 5/232* (2006.01)
*H04N 9/64* (2006.01)
*G06K 9/00* (2006.01)
*H04N 5/262* (2006.01)

(52) U.S. Cl.
CPC ..... *H04N 5/23222* (2013.01); *G06K 9/00664* (2013.01); *G06K 9/00684* (2013.01); *H04N 5/23218* (2018.08); *H04N 5/23219* (2013.01); *H04N 5/232935* (2018.08); *H04N 5/2621* (2013.01); *H04N 9/646* (2013.01); *G06K 2209/17* (2013.01)

(58) Field of Classification Search
CPC .......... H04N 5/23218; H04N 5/23219; H04N 5/23222; H04N 5/232935; H04N 5/2621; H04N 9/646; G06K 9/00664; G06K 9/00684; G06K 2209/17
See application file for complete search history.

(56) References Cited

U.S. PATENT DOCUMENTS

| 2008/0180542 A1* | 7/2008 | Kuniyuki | H04N 5/23219 348/222.1 |
| 2012/0176401 A1* | 7/2012 | Hayward | G06F 3/0488 345/619 |
| 2013/0195320 A1* | 8/2013 | Petrescu | H04N 5/23219 382/103 |
| 2014/0119601 A1* | 5/2014 | Yoshizumi | G06T 7/60 382/103 |

(Continued)

OTHER PUBLICATIONS

Meitu, "China's #1 Photo Editing App", http://global.meitu.com/en/products#M Accessed on Apr. 23, 2019, 1 page.

*Primary Examiner* — Quan Pham
(74) *Attorney, Agent, or Firm* — Kilpatrick Townsend & Stockton LLP

(57) ABSTRACT

In some embodiments, an image processing application executing on a processing device detects an object in an image that is in a field of view of a camera associated with the processing device. The image processing application further determines, based on the object detected in the image, a recommended filter for the image from a list of filters available for filtering the image. The image processing application causes a display device to display a user interface that includes a contextual user interface control. The contextual user interface control indicates that a context-aware image filtering mode is available for the image. Responsive to receiving a selection of the contextual user interface control, the image processing application enables the context-aware image filtering mode by automatically applying the recommended filter to the image to generate a filtered image and causes the display device to display the filtered image.

18 Claims, 8 Drawing Sheets

(56) References Cited

U.S. PATENT DOCUMENTS

| | | | |
|---|---|---|---|
| 2016/0100101 A1* | 4/2016 | Cohen | H04N 13/122 |
| | | | 348/207.1 |
| 2017/0244907 A1* | 8/2017 | Lee | H04N 9/07 |
| 2017/0339409 A1* | 11/2017 | Socek | H04N 19/167 |
| 2018/0081974 A1* | 3/2018 | Miller | G06F 16/335 |
| 2018/0107360 A1* | 4/2018 | Kim | G06F 3/04817 |
| 2018/0131878 A1* | 5/2018 | Charlton | H04N 5/272 |
| 2018/0210628 A1* | 7/2018 | McPhee | G06F 3/0346 |

* cited by examiner

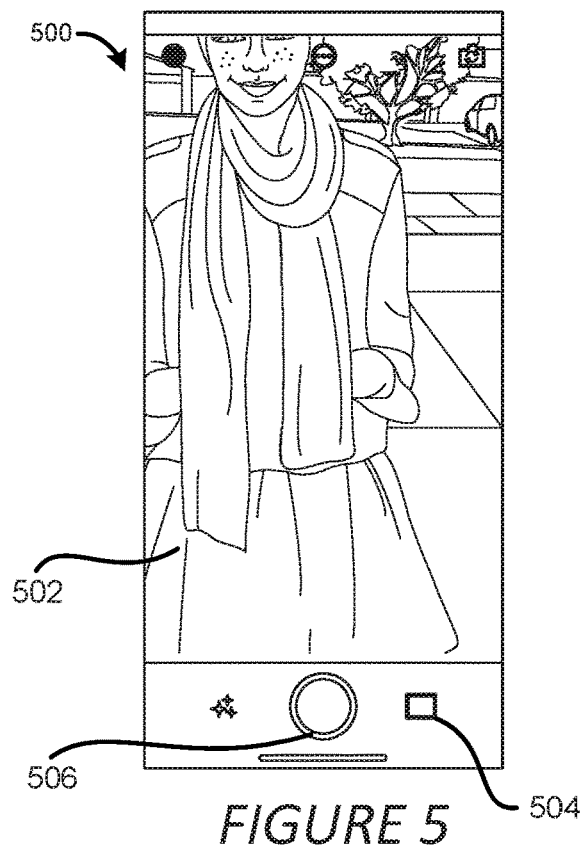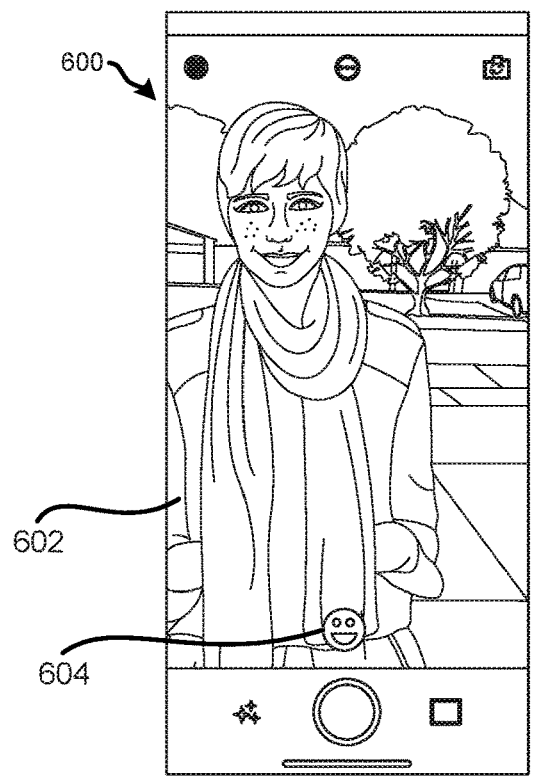
FIGURE 5  FIGURE 6
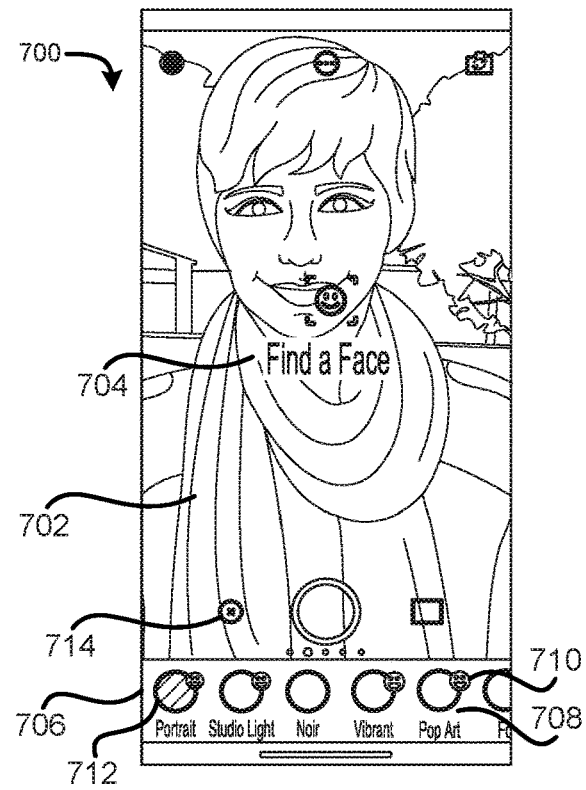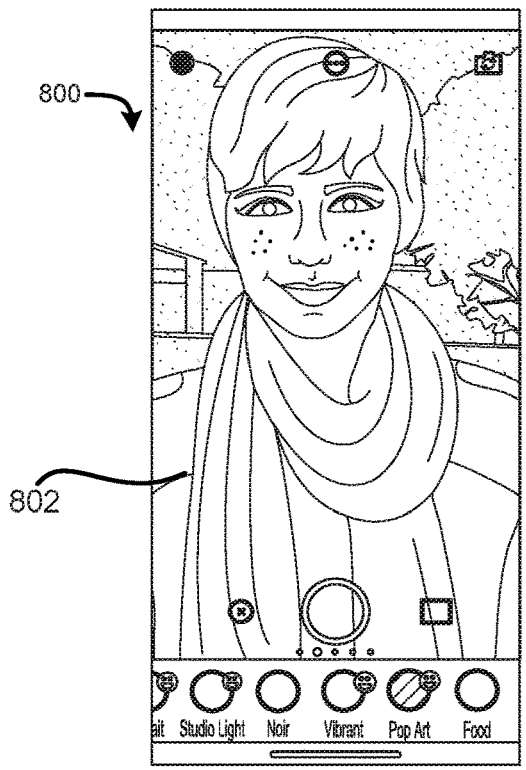
FIGURE 7  FIGURE 8

CONTEXT-AWARE IMAGE FILTERING

TECHNICAL FIELD

This disclosure relates generally to computer-implemented methods and systems for computer graphics processing. Specifically, the present disclosure involves automatically filtering an image based on the content of the image.

BACKGROUND

Mobile cameras, such as the cameras embedded in a smartphone or a tablet, allow a user to take photos anywhere and anytime. For novice photographers, however, knowing which filters or effects to apply when photographing can be overwhelming. Existing mobile camera apps typically present to the user a list of filters. Effects that can be created by these filters are buried in the detailed settings. Photographers who are unfamiliar with the filters and various settings would have to try out the filters and settings one by one, which is a time-consuming process. Even after trying different filters or settings, the photographers might still be unsure about which filter provides the desired look for their photos, leading to unsatisfactory results in the captured photos.

These and other disadvantages exist with respect to conventional image filtering systems.

SUMMARY

Certain embodiments involve context-aware image filtering for mobile cameras. In one example, an image processing application executing on a processing device detects an object in an image that is in a field of view of a camera associated with the processing device. The image processing application further determines, based on the object detected in the image, a recommended filter for the image from a list of filters available for filtering the image. The image processing application causes a display device to display a user interface that includes a contextual user interface control. The contextual user interface control indicates that a context-aware image filtering mode is available for the image. Responsive to receiving a selection of the contextual user interface control, the image processing application enables the context-aware image filtering mode by automatically applying the recommended filter to the image to generate a filtered image and causes the display device to display the filtered image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 5 depicts an example of a user interface for context-aware image filtering, according to certain embodiments of the present disclosure.

FIG. 6 depicts another example of a user interface for context-aware image filtering, according to certain embodiments of the present disclosure.

FIG. 7 depicts yet another example of a user interface for context-aware image filtering, according to certain embodiments of the present disclosure.

FIG. 8 depicts yet another example of a user interface for context-aware image filtering, according to certain embodiments of the present disclosure.

DETAILED DESCRIPTION

Figure 1:
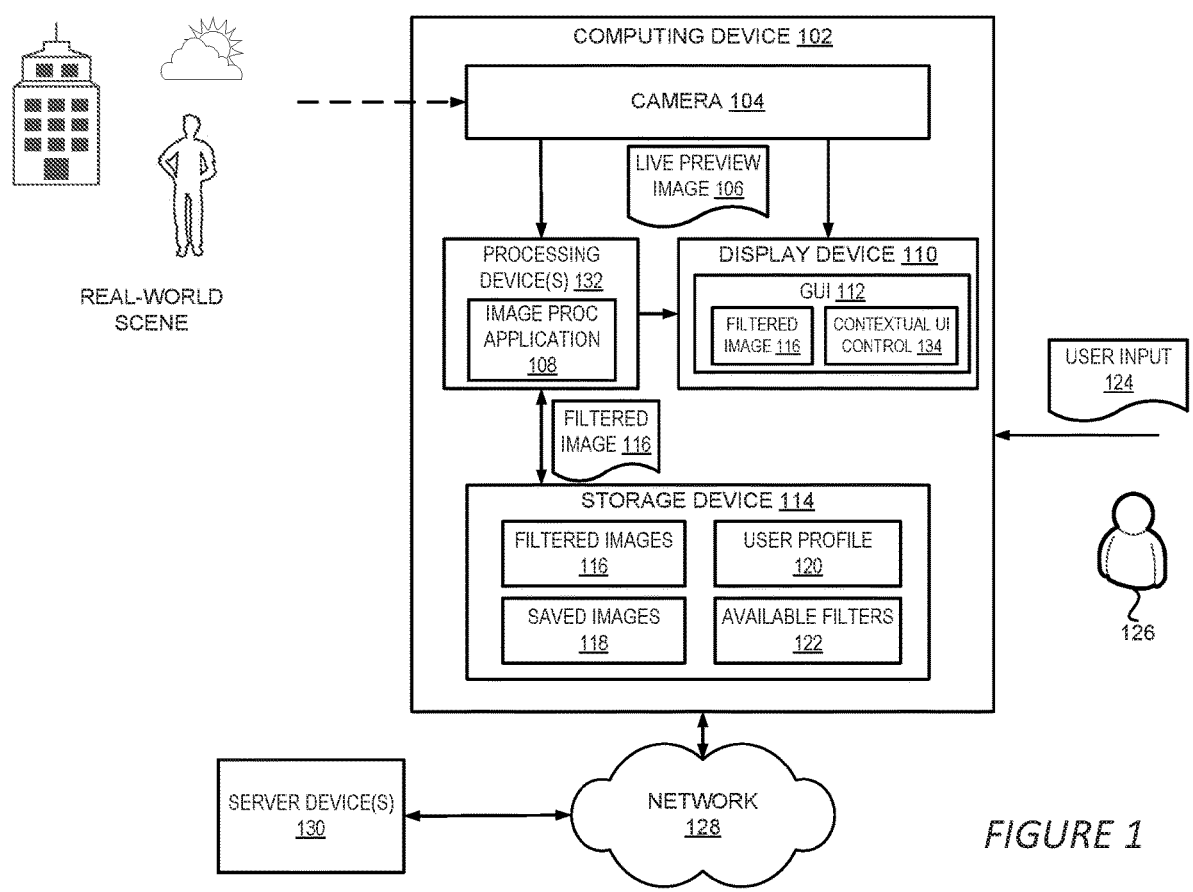
FIG. 1 depicts an example of a computing environment for providing context-aware image filtering according to certain embodiments of the present disclosure.

The present disclosure involves context-aware image filtering for mobile cameras. As discussed above, existing mobile camera apps provide little or no assistance to users of cameras to choose proper filters for their pictures leading to unsatisfactory results in the captured pictures. Certain embodiments described herein address these limitations by analyzing the images from a camera in real time or near real time and providing recommendations on filters to be used on the images. For instance, an image processing application accesses an image that is in the field of view of the camera and detects an object in the image. Based on the detected object, the image processing application determines, from a list of available filters, a recommended filter that is designed to filter or suitable for filtering the detected object or images containing the detected object. The image processing application generates and presents a user interface to indicate that an object is detected in the image and a context-aware image filtering mode is available. If the image processing application receives user input confirming that the context-aware image filtering mode should be enabled, the image processing application automatically applies the recommended filter to the image to generate a filtered image for display. The image processing application provides a user with an option to save the filtered image or adjust the filtering by using another setting of the recommended filter or using another filter.

The following non-limiting example is provided to introduce certain embodiments. In this example, an image processing application receives an image from a camera. The image depicts the visual perception of the scene that is currently in the field of the view of the camera and, if the camera moves, is updated to depict a modified scene within the camera's field of view. Such an image is also referred to herein as a "live preview image" because the image allows a user to preview the content of an image before saving the image to a memory device. The image processing application detects an object in the image, for example, a face, an animal, a house, a tree, a dish, a mountain, and so on. Based on the detected object, the image processing application selects, from a list of available filters, one or more filters that are applicable to the detected object. For example, if a face is detected in the image, the image processing application identifies one or more filters that are applicable to filtering a face object, such as a filter designed to smooth skin tone or a filter for turning a color image to a grey image.

From the applicable filters, the image processing application determines a recommended filter to be applied to the image. The determination can be made based on, for example, the type of the object, the preference or past behavior of the user, the geographical location where the image is taken, the date or time when the image is taken, or other factors. In the above example, the image processing application determines that the filter designed to smooth the skin tone is more suitable for the face object detected in the image and thus determine this filter as a recommended filter.

The image processing application further generates and presents a user interface indicating that a context-aware image filtering mode is available. The indication can be provided by presenting a contextual user interface control in the user interface. If the user selects the contextual user interface control, the image processing application enters the context-aware image filtering mode and automatically applies the recommended filter to the image to generate a filtered image for display. The image processing application continues to access updated images from the camera and apply the recommended filter to the updated image until a user input is received. Depending on the user input, the image processing application can save the filtered image or discard the result and restart the above process for a new image received from the camera. In some examples, the image processing application further presents the list of applicable filters along with the recommended filter in the user interface so that the user can select a different filter to generate the filtered imaged.

As described herein, certain embodiments provide improvements in image processing by providing context-aware image filtering. These embodiments provide context-aware image filtering by, for example, automatically analyzing the image captured by a camera in real time and generating a filtered image using a recommended filter based on the analysis of the image. The context-aware image filtering improves the quality of the filtered image by determining the recommended filter based on the content of the image thereby reducing the impact on the quality of the filtered image by the uncertainty in filter selection caused by the inexperienced user. This also ensures consistency in the quality of the captured images using the camera. Further, the context-aware image filtering significantly reduces the time and efforts a user spends on adjusting the image to achieve the desired result, thereby improving the user experience with the camera.

Example Operating Environment for
Context-Aware Image Filtering

Referring now to the drawings, FIG. 1 depicts an example of a computing environment 100 for providing context-aware image filtering. The computing environment 100 includes a computing device 102, which includes one or more processing devices 132 that execute an image processing application 108. The image processing application 108 includes program code to perform one or more functions for context-aware image filtering that generate filtered image 116. Examples of the computing device 102 include a smartphone, a tablet, a digital camera, or any other types of mobile device that includes at least a camera, a display and a processing device capable of filtering images captured by the camera.

The computing device 102 further includes a camera 104. The camera 104 is an optical instrument for recording or capturing an image 106 of the real-world scene that is in the field of view of the camera 104. The computing device 102 further includes a display device 110 configured to present information in a visual form. For example, the display device 110 might be configured to display graphical user interface ("GUI") elements, text, images, video, or other data.

In one example, the camera 104 is coupled with the display device 110 to provide a live preview feature. The live preview feature allows live preview images of the camera 104 to be displayed on the display device 110 so that a user 126 of the computing device 102 can view the image before saving it to a storage device 114. This allows the display device 110 to be used as a viewfinder of the camera 104. In addition to the live preview images, the display device 110 is further utilized to display a user interface 112 generated by the image processing application 108. The user interface 112 receives commands or other input from a user that cause the image processing application 108 to manipulate the live preview images displayed thereon or adjusting camera parameters. The image processing application 108 generates and presents the user interface 112 to allow the user 126 to view the live preview image 106 and the filtered image 116 generated by the context-aware image filtering in real time or near real time, and to allow the user 126, through user input 124, to make various selections regarding the live preview image 106 and the filtered image 116 including saving the filtered image 116 to the storage device 114.

According to embodiments presented herein, the image processing application 108 accesses the live preview images from the camera 104 to perform the context-aware image filtering. In one example, the image processing application 108 obtains a live preview image 106, also referred to as "image 106," from the camera 104. The image processing application 108 analyzes the live preview image 106 to determine the subject of the image 106. For example, the image processing application 108 can analyze the live preview image 106 to detect an object, a scene, color or any combination thereof in the image. Based on the analysis, image 106 can be classified into one or more of categories of images. The categories of images include, but are not limited to, a human face category, a natural scene category, a sky category, a food category, a night-time category, and so on. Additional examples of analyzing the live preview image 106 and determining the category of the image are provided below with regard to FIGS. 2-4.

Based on the determined image category, the image processing application 108 identifies a list of filters that are applicable to the live preview image 106. The image processing application 108 selects the list of applicable filters from a set of available filters 122. The available filters 122 can be stored, in the storage device 114 associated with the computing device 102, as a filter library and can be invoked by the image processing application 108 if needed. The set of available filters 122 include all the filters that can be invoked by the image processing application 108 to apply to an image regardless of the effects. However, some of the available filters 122 are not suitable for a certain category of images. For example, a filter designed for smoothing the skin tone of a face is not suitable for an image depicting a natural scene. Similarly, a filter designed for brightening the sky might not be suitable for an image of food. Some filters, on the other hand, are applicable to any category of images. For example, a filter for turning a color image into a black-and-white image can be applied to any color image. A 3D filter configured for inserting a 3D object into an input image to generate a combined image can also be applied to any image.

Based on the properties of the available filters 122 and the category of the live preview image 106, the image processing application 108 selects a list of filters that are applicable to the image 106. In the above examples, if the live preview image 106 is determined to be an image of human face, the filter for smoothing the skin tone, the 3D filter, and the filter for converting color images into black-and-white images may be included in the list of filters that are applicable to the image 106, whereas the filter for brightening the sky will not be included in the list of applicable filters.

Among the list of applicable filters, the image processing application 108 further selects a recommended filter that can be applied to the live preview image 106. The recommended filter can be determined by matching the property of the filter with the content of the live preview image 106, such as by matching a filter designed to filter a face to an selfie image, matching a filter designed for brightening the sky to an outdoor image with a large portion depicting the sky, and so on. Selecting the recommended filter can further be based on a user profile 120 established for a user 126 of the computing device 102. The user profile 120 can include the preference or past behavior of the user 126, such as the filters selected by the user 126 in the past for each category of images, the user's preference on the color, brightness, and contrast of images in each category. The user profile 120 can be built based on the user's explicit input or by analyzing the saved images 118, such as a photo gallery, on the storage device of the computing device 102. Furthermore, the user profile 120 can be built based on data related to the user 126 that are stored on various remote servers 130 accessible over a network 128, such as the user's social media account, the user's online photo album, and so on. In some implementations, the image processing application 108 can access these online data related to the user by integrating, with the user's permission, with the apps that are installed on the computing device 102 for accessing the online data. In one example, the user profile 120 is also stored in the storage device 114.

In further examples, the recommended filter can be selected based on contextual information, such as the geographical location of the computing device 102 indicating where the image is captured, the date when the image is captured, the time of the image being captured, or events associated with the image. The contextual information is useful to select a recommended filter that is relevant to the location, date, time or event associated with the image. For example, a filter designed for adding virtual green and red 3D holiday decorations to an image can be recommended if the date of the image being captured is close to Christmas day. Similarly, a filter designed to add a text such as "Welcome to the Golden Gate Bridge" can be recommended if the image processing application 108 determines that the current location of the computing device 102 is near Golden Gate Bridge and the content of the image 106 has a bridge object. The image processing application 108 can obtain these contextual data from other components of the computing device 102 (not shown in FIG. 1), such as a GPS component, an internal clock and so on. Additional examples of determining the recommended filer are provided with regard to FIGS. 2-4.

In various embodiments, the above process for analyzing the live preview image 106 and determining the list of applicable filters and the recommended filter are automatically performed without user's intervention. For instance, the above process could commence in response to some trigger other than a user input causing the camera to capture and store an image. Examples of these triggers include a live preview image 106 being displayed within the camera's field of view for a threshold amount of time, a threshold amount of change in the scene displayed within the camera's field of view, etc. The image processing application 108 accesses the live preview image 106 from time to time so that the live preview image 106 reflects the real-world scene that is currently in the field of view of the camera 104. For each live preview image 106, the image processing application 108 automatically performs the process described above to analyze the image and determine the recommended filter and list of the applicable filters.

As the image processing application 108 analyzes the live preview image 106, if the subject of the live preview image 106 is determined, such as by detecting an object in the live preview image 106, the image processing application 108 generates and presents a contextual user interface control 134 in the user interface 112 to indicate that context-aware image filtering is available. The user 126 can view the results of the context-aware image filtering by selecting the contextual user interface control 134, such as by touching or selecting the contextual user interface control using his finger or a stylus, or otherwise activating it, e.g. using a voice command.

If the image processing application 108 determines that the user 126 has selected the contextual user interface control 134, the image processing application 108 enters a context-aware image filtering mode. The mode of the image processing application 108 before the user selects the contextual user interface control 134 is referred to as pre-context-aware image filtering mode. In the context-aware image filtering mode, the image processing application 108 automatically applies the recommended filter to the live preview image 106 to generate the filtered image 116 and present the filtered image 116 in the user interface 112. The image processing application 108 also presents the list of applicable filters in the user interface 112. The user 126 may select another filter from the list of applicable filters to apply to the live preview image 106 to generate the filtered image 116. In a further implementation, the image processing application 108 provides further user interface controls to allow the user 126 to adjust the parameters of the filter being applied. The image processing application 108 updates the filtered image 116 based on the parameter specified by the user 126 and display the filtered image 116 in real time or near real time in the user interface 112. If the user requests the filtered image 116 to be saved, the image processing application 108 saves the current filtered image 116 to the storage device 114 or other location specified by the user 126. Additional details on the user interface 112 are provided below with regard to FIGS. 5-9. Additional details regarding the context-aware image filtering are described herein with respect to FIGS. 2-10.

Examples of Computer-Implemented Operations for Context-Aware Image Filtering

Figure 2:
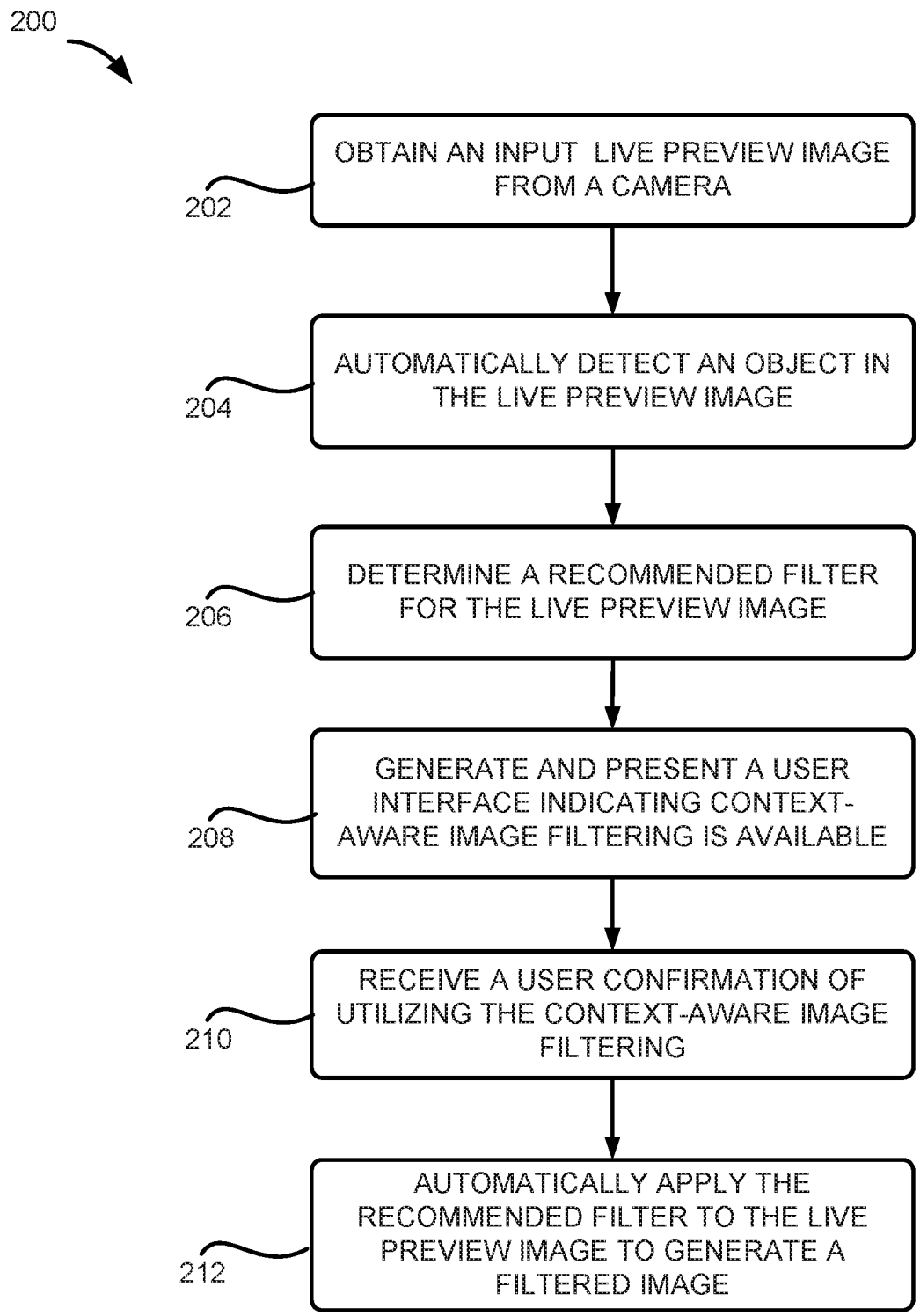
FIG. 2 depicts an example of a process for determining a recommended filter and automatically applying the recommended filter to a live preview image to generate a filtered image, according to certain embodiments of the present disclosure.

FIG. 2 depicts an example of a process 200 for determining a recommended filter and applying the recommended filter to the live preview image to generate a filtered image, according to certain embodiments of the present disclosure. In some embodiments, operations depicted in FIG. 2 and described herein are used to implement a step for determining a recommended filter and applying the recommended filter to the live preview image to generate a filtered image. FIG. 2 is described in conjunction with FIG. 3 where an example of a block diagram of the software modules used for context-aware image filtering is depicted. A computing device (e.g., the computing device 102) implements operations depicted in FIG. 2 by executing suitable program code (e.g., the image processing application 108). For illustrative purposes, the process 200 is described with reference to certain examples depicted in the figures. Other implementations, however, are possible.

At block 202, the process 200 involves obtaining a live preview image 106 from a camera 104 of the computing device 102. For instance, the camera 104 continuously and directly projects the image formed by the lens of the camera 104 onto the image sensor to generate the live preview image 106. The image processing application 108 obtains the live preview image 106 by accessing the memory that stores the live preview image 106 or through other means.

Figure 3:
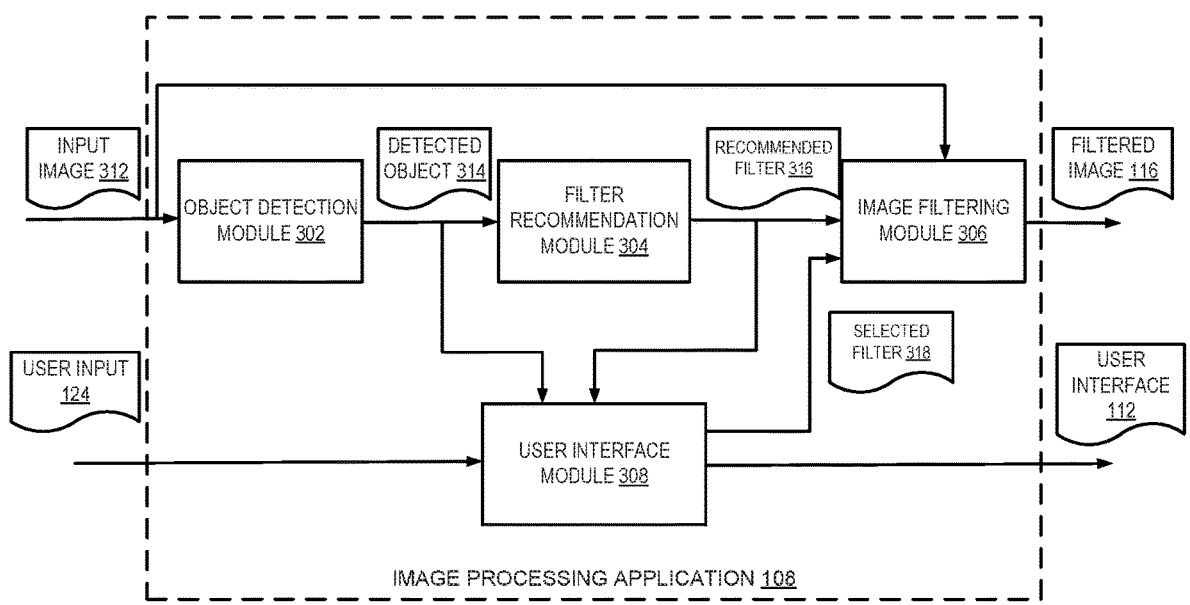
FIG. 3 depicts an example of a block diagram of an image processing device configured to perform the context-aware image filtering, according to certain embodiments of the present disclosure.

At block 204, the image processing application 108 enters the pre-context-aware image filtering mode, and the process 200 involves automatically detecting an object 314 in the live preview image 106. As shown in FIG. 3, in one example, the image processing application 108 employs an object detection module 302 to detect the object 314 in the live preview image 106. For example, the object detection module 302 employs a face detection algorithm to the live preview image 106 to determine whether a face object exists in the live preview image 106. Appearance-based face detection methods, such as those based on genetic algorithm, eigen-face techniques or a machine learning model trained to recognize human faces from images can be utilized to detect human faces in the live preview image 106. Other techniques that are known in the art for detecting a human face from an image can also be utilized, such as feature-based, knowledge-based, or template matching methods. Similarly, other types of object detection algorithms can be applied to the live preview image 106 to detect objects 314, such as car object, human object, building objects, a food object, a tree, a mountain and so on.

In some implementations, to reduce the computational complexity of the context-aware image filtering and to conserve power of a battery-powered computing device 102, one or more operations of the object detection module 302 are performed on a down-sampled version of the live preview image 106. In one example, the live preview image 106 is down-sampled to a maximum of 480 pixels in height, and the resolution of the down-sampled image is determined based on the aspect ratio that the user has selected for the live preview image 106 in the camera settings. In other words, the live preview image 106 is down-sampled to generate a test image by keeping the aspect ratio of the live preview image 106. The generated test image has a maximum height of 480 pixels and the width of the test image is determined based on the aspect ratio of the live preview image 106. Because the test image is smaller than the live preview image 106, the object detection module 302 can perform the object detection using fewer computations.

Similarly, the object detection module 302 can further reduce the computational complexity of object detection by limiting the detection operation to certain live preview images or down-sampled test images. In one example, the object detection module 302 detects the object in the live preview image 106 or the down-sampled test image of the live preview image 106 for every N images, such as N=10 images, captured by the camera 104, instead of every image. The Nth detection of a live preview image 106 or the down-sampled test image can be a trigger that causes the image processing application 108 to automatically perform certain operations of process 200.

Certain embodiments that involve this reduction in computational complexity can facilitate object detection for the context-aware image filtering to determine the presence of the object. For instance, the reduced spatial resolution and temporal resolution of the live preview images 106 can provide enough information to perform object detection without imposing a high computational burden on the computing device 102. In addition, object tracking (i.e. tracking the detected object in positional space from one live preview image 106 to another) is not performed in this pre-context-aware image filtering mode to reduce the computation power of the computing device 102.

In some scenarios, more than one object might be detected in the live preview image 106. For example, a face object in the foreground and scenery in the background are both detected in the live preview image 106. To determine the dominant object in the live preview image 106, the image processing application 108 employs a tie-breaking mechanism. In one example, the image processing application 108 examines the percentage of the space that each object occupies in the live preview image 106. For each type of object, a threshold amount of space can be specified. If the detected object occupies a percentage amount of space more than the corresponding threshold amount of space, the object is selected as the detected object. In the above example, for a face image, if the largest detected face object is more than 15% of space in the live preview image 106, the image processing application 108 determines that a face object is detected. Otherwise, the image processing application 108 determines that scenery is detected in the live preview image 106.

Referring back to FIG. 2, at block 206, the process 200 involves determining a recommended filter for the live preview image 106 based on the detected object. One or more computing devices execute program code from the image processing application 108 to implement block 204. For instance, the image processing application 108 applies a filter recommendation module 304 as shown in FIG. 3 to determine the recommended filter 316. In some implementations, the filter recommendation module 304 maintains or accesses a list of filters that are available for filtering an image. The list of available filters can include the filters that are available locally on the computing device 102, such as stored locally in a library on the storage device 114, or remotely from an online filtering service, for example.

Based on the available filters, the filter recommendation module 304 determines a list of filters that are applicable to the live preview image 106. In one example, whether a filter is applicable to the live preview image 106 is determined based on whether the filter is designed to filter the type or category of the live preview image 106. The filter recommendation module 304 determines a type or a category of the live preview image 106 based on the detected object 314. For instance, if the detected object 314 is a human face, the filter recommendation module 304 can determine that the live preview image 106 is in the category of face images, and filters that are designed to smooth the skin tone would be included in the list of applicable filters for the live preview image 106. If the detected object 314 is a building, the filter recommendation module 304 can determine that the live preview image 106 is in the category of outdoor scene images, and filters for filtering outdoor scene can be included in the list of applicable filters. If the detected object 314 is a food object, the filter recommendation module 304 can determine that the live preview image 106 is in the category of food images, and filters for filtering food can be included in the list of applicable filters. The applicable filters can also include filters that are applicable to images regardless of the categories of the image, such as a filter converting a color image to a black-and-white image, or a filter creating a painting effect from an image.

From the list of applicable filters, the filter recommendation module 304 selects a recommended filter 316 for the live preview image 106. In some implementations, the filter designed to filter images in the category of the live preview image 106 is selected as the recommended filter, such as a skin tone smoothing filter is recommended for a selfie image, a food filter is recommended for a food image. In addition, the recommended filter can be selected based on a number of other factors. In one example, the filter recommendation module 304 can select the recommended filter based on the past behavior of the user in selecting a filter for an image in the same category as the live preview image 106. For instance, if the filter recommendation module 304 determines that the user has selected the filter for smoothing the skin tone for most of her selfie photos, the filter recommendation module 304 would select the filter for smoothing the skin tone for images in the category of face images, such as a selfie image or other images containing a face.

The user's past behavior is established in a user profile 120 by the image processing application 108 or other applications on the computing device 102. In some embodiments, the image processing application 108 accesses, with the permission from the user, the saved images 118, such as a photo gallery, on the computing device 102 to determine the filters used for those saved images 118. For example, if the saved images 118 have over a certain threshold of percentage of images containing food with more cool colors (such as in blue, green, gray tone), the image processing application 108 adds, to the user profile 120, data stating that the suggested filter for food images for this particular user should include filters that generate cool colors. The image processing application 108 can also maintain a record of the selected filter by the user in filtering images in the past. Further, as briefly discussed above, the image processing application 108 can also build the user profile 120 based on data related to the user that are stored on various servers 130 accessible over the network 128, such as the user's social media account, the user's online photo album, and so on.

In addition to user profile 120, the filter recommendation module 304 can further select the recommended filter 316 based on contextual information, such as the geographic location of the computing device 102. For example, a filter designed to add a text such as "Welcome to the Golden Gate Bridge" is recommended if the image processing application 108 determines that the current location of the computing device 102 is near Golden Gate Bridge and the content of the image 106 shows a bridge. Likewise, a filter for inserting a 3D object that is related to the location into the image can also be selected based on the detected location of the computing device 102. In one implementation, the image processing application 108 determines the location of the computing device 102 using a GPS component of the computing device 102. Other mechanisms may also be utilized to determine the geographical location of the computing device 102, and thus the geographical location where the live preview image 106 is captured.

In some embodiments, the contextual information used to select the recommended filter 316 also include the date of the live preview image 106 being captured by the camera 104. The filter recommendation module 304 utilizes the date to determine if there is any special event associated with the image so that filters designed for those events can be recommended to the user. For example, a filter designed to add virtual green and red holiday decorations to an image is recommended if the date of the image being captured is close to Christmas day, or a filter for adding bunnies and eggs is recommended to the user if the date is close to Easter Day.

Likewise, the time when the live preview image 106 is captured by the camera 104 can also be utilized to select the recommended filter 316. The filter recommendation module 304 uses the date information along with analyzing the content of the image to determine whether the live preview image 106 is a nighttime image or a day time image. Depending on the results, a filter for filtering night time image or a filter for filtering day time image can be recommended.

In some implementations, additional algorithms that are specific to an image category are also utilized to determine the recommended filter and the parameters of the recommended filter. For example, if a face object is detected in the live preview image 106, the filter recommendation module 304 uses an algorithm to detect the mood of the face, such as sad, happy, nonchalant, or bubbly. The detected mood can be utilized to determine the recommended filter for face images. Further, a face tracking algorithm which analyzes the skin tone of the user by examining the percentage of colors in the detected face object can be utilized for proper face lighting using the recommended filter and filter parameters. Another example includes using a tracking algorithm to analyze the facial features of the detected object to determine if a user is smiling or frowning, thereby determining the recommended filter and filter parameters.

For food images, an algorithm which analyzes the colors in the live preview image 106 and determines if the food is warm (orange, brown, red colors) or cold (blue, green, gray colors) may be utilized to determine the recommended filer. For scenery images, the filter recommendation module 304 can utilize an algorithm to analyze the ambiance, such as whether it is raining or sunny, or whether there are rainbows, to determine the recommended filter and filter parameters. The filter recommendation module 304 assigns different weights to combine the various factors to select the recommended filter 316. In addition, a machine learning model can be built and trained to determine the recommended filter based on the various factors and the detected object in the live preview image 106. For instance, the machine learning model has multiple inputs corresponding to the factors described above and the detected object or the category of images. The output of the machine learning model includes an index of the recommended filter or a vector containing multiple values each indicating the confidence of recommending a corresponding filter. The training of the machine learning model is performed iteratively based on the training data so that a loss function is minimized. The trained machine learning model can then be utilized to predict the recommended filter for a live preview image based on the object detected and other factors or features associated with the live preview image.

Referring back to FIG. 2, block 208 involves generating and presenting a user interface to indicate that context-aware image filtering is available for the live preview image 106. By detecting the object 314 and determining the category of the live preview image 106, the image processing application 108 may determine that context-aware image filtering is available for the live preview image 106. The image processing application 108 generates and presents a user interface to inform the user that a context-aware image filtering mode is available and can be enabled. In the example shown in FIG. 3, the image processing application 108 employs a user interface module 308 to generate and present the user interface 112 on the display device 110. In one implementation, the indication of the context-aware image filtering mode can be presented through a contextual user interface control 134, such as an icon or a button. The contextual interface control is configured to be actionable so that the user can press, click or otherwise select the contextual interface control, e.g. through a voice command, to confirm to enable the context-aware image filtering mode. The contextual interface control can also be presented along with other mechanisms of notification, such as by playing a sound or flashing an LED light.

At block 210, the process 200 involves receiving a user confirmation of enabling the context-aware image filtering mode through the user interface 112. At block 212, the process 200 involves enabling the context-aware image filtering mode and automatically applying the recommended filter to the live preview image 106 to generate the filtered image 116. The filtered image 116 can be generated by an image filtering module 306 as shown in the example of FIG. 3 and be presented in the user interface 112 through the user interface module 308.

In addition, the user interface module 308 is also configured to list the recommended filter 316 and the list of applicable filters in the user interface 112. The user thus can select another filter for the live preview image 106 from the applicable filters to replace the recommended filter 316. The selected filter 318 is utilized by the image filtering module 306 to generate an updated filtered image 116 to display in the user interface 112. In another example, the user interface module 308 also presents user interface controls to allow the user to adjust the parameters of the selected filter 318 including the recommended filter 316. The image filtering module 306 updates the filtered image 116 by applying the selected filter 318 using the adjusted parameters set by the user. The user can save the filtered image 116 if he or she is satisfied with the result. If, at some point, the detected object can no longer be found in the current live preview image 106, the image processing application 108 automatically exits the context-aware image filtering mode, and optionally, provides a notification to the user in the user interface 112 to indicate that the image processing application 108 has exited the context-aware image filtering mode. Additional examples of the user interface 112 and the operations related to the user interface 112 are provided below with regard to FIGS. 5-9.

To generate the filtered image 116, in some implementations, the image filtering module 306 applies the recommended filter or the selected filter to the full resolution of live preview image 106, i.e. the live preview image 106 that has not been down-sampled. The image filtering module 306 is also configured to implement object detection and object tracking to track the detected object from one live preview image 106 to another live preview image 106 as the camera 104 moves and new live preview images 106 are available to the image processing application 108. For example, face tracking can be implemented to track the face object detected in the live preview image 106 so that if the user moves the camera 104, the detected face can still be located in the new live preview image 106 for filtering. Likewise, other types of objects can be tracked in a similar way so that the recommended filter or selected filter can be applied properly. To improve the tracking accuracy, in the context-aware image filtering mode, the image processing application 108 is configured to process live preview images 106 more frequently than the pre-context-aware image filtering mode. In other words, the live preview images 106 generated by the camera 104 are sampled more frequently for processing such as processing an image for every 3 live preview images 106 captured by the camera 104.

Figure 4A:
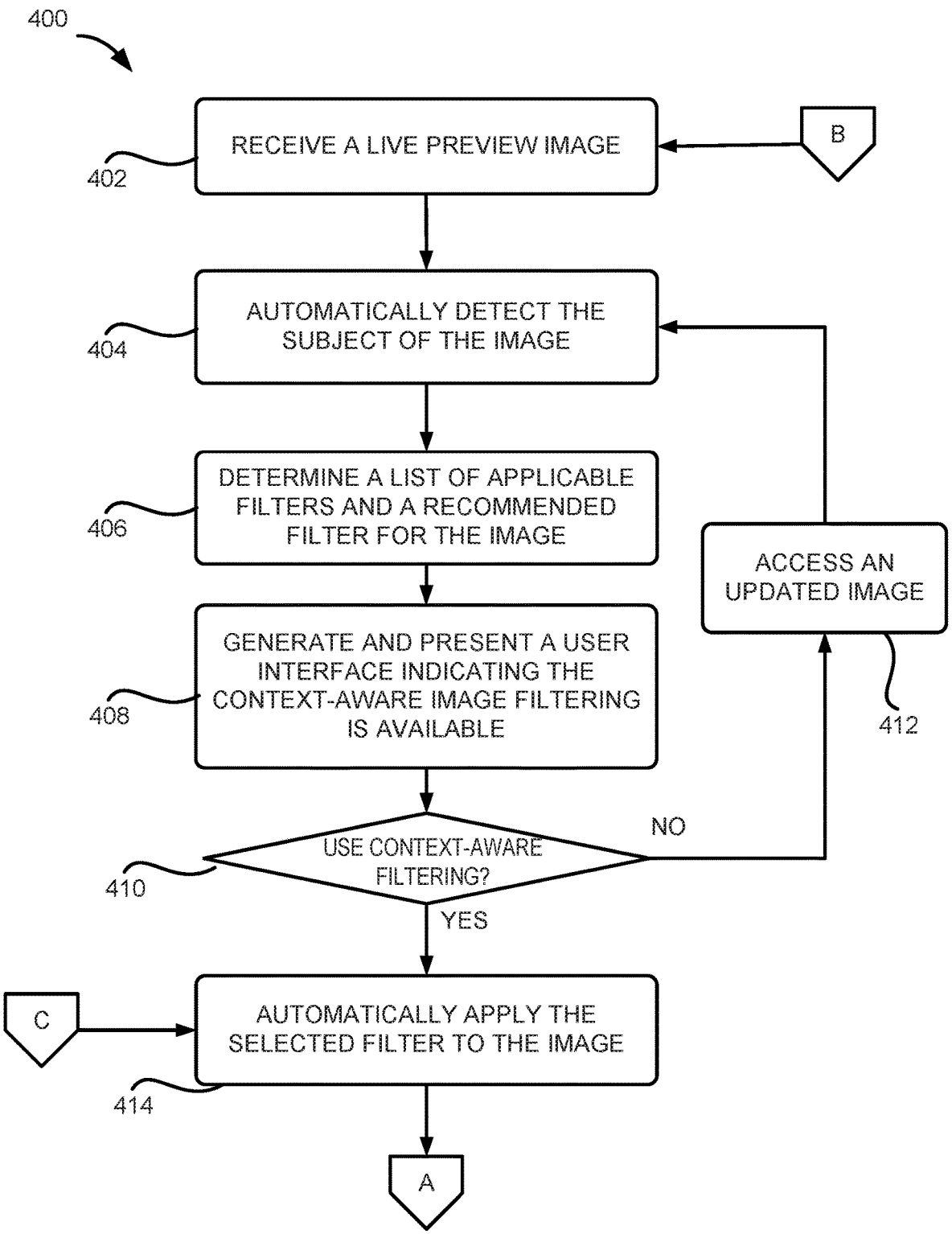
FIGS. 4A and 4B depict an example of a process for utilizing context-aware image filtering to process live images from a camera of a mobile device, according to certain embodiments of the present disclosure.
Figure 4B:
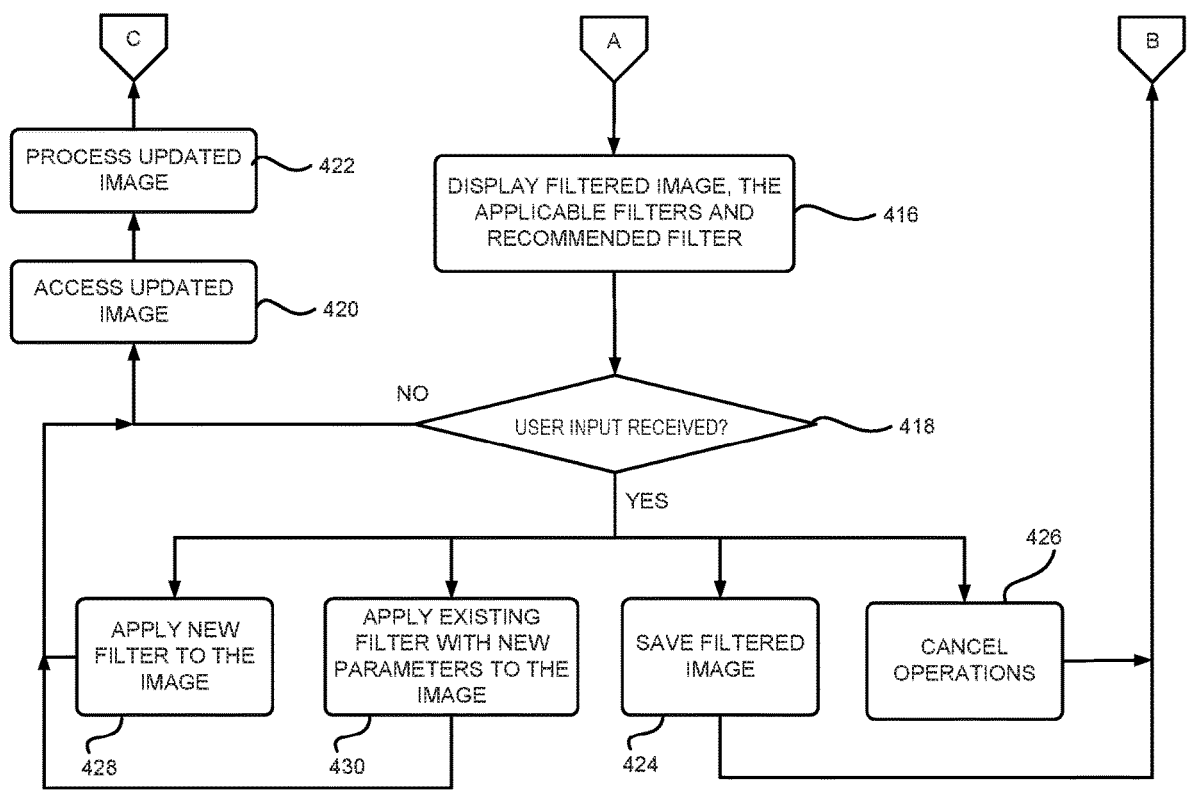

FIGS. 4A and 4B depict an example of a process 400 for utilizing context-aware image filtering to process live preview images 106 from a camera 104 of a computing device 102, according to certain embodiments of the present disclosure. At block 402, the process 400 involves receiving a live preview image 106 from the camera 104. The image processing application 108 receives the live preview image 106 in a similar way as described with respect to block 202 of FIG. 2.

At block 404, the process 400 involves automatically detecting the subject of the live preview image 106. As used herein, the "subject" of the image refers to content, topic, or keywords associated with the person or thing shown in the live preview image 106. The subject of the live preview image 106 can be detected by detecting one or more objects in the live preview image 106, such as a face, car, human, building, food, tree, mountain, and so on. For example, the image processing application 108 can detect a live preview image 106 as a selfie image by detecting a face in the image. In another example, the image processing application 108 detects that the subject of the live preview image 106 includes a natural scene by detecting sky, lawn, tree, lakes, etc. The subject of the live preview image 106 might also be detected by analyzing the color tone of the live preview image 106. For example, a dark color tone might suggest that the live preview image 106 is a nighttime image, and a light color tone might suggest a day time image. Likewise, a colorful image might suggest that the subject of the live preview image 106 includes food. Further, blue, green, gray colors suggest cold food whereas orange, brown, red colors suggest warm food. The detection of the subject of the image can be performed by utilizing an object detection algorithm, such as a face detection algorithm based on the genetic algorithm and the eigen-face technique. Machine learning models can also be built and trained to recognize various objects or subjects of an image and be utilized to detect the subject of the live preview image 106.

If more than one object or subject are detected in the live preview image 106, the image processing application 108 can utilize the tie-breaking mechanism described above with regard to block 204 in FIG. 2 to determine the object or subject of the image. Also similar to block 204, the image processing application 108 may detect the subject of the live preview image 106 by using a down-sampled version of the live preview image 106 to reduce the computational resource consumption.

At block 406, the process 400 involves determining a list of applicable filters for the live preview image 106 from which a recommended filter is identified. This block involves similar operations like those involved in block 206 described with respect to FIG. 2. Similar to block 206, in block 406, the list of applicable filters and the recommended filter can be determined based on the subject of the live preview image 106. The image processing application 108 can determine a type or category of the live preview image 106 based on the subject of the live preview image 106. The categories include, but are not limited to, selfie images, human images, food images, outdoor scene images, nighttime images, daytime images, and so on. A live preview image 106 might be determined to belong to two or more image categories. In that case, the list of applicable filters can include filters that are applicable to the images in these two or more categories. The applicable filters also include the general image filters applicable to images regardless of the categories of the images.

The image processing application 108 determines the recommended filter 316 in a similar way to that described with respect to block 206. For example, the image processing application 108 can determine the recommended filter 316 based on the category of the live preview image 106. Other factors, such as the past behavior of the user, the preference of the user, contextual information including the geographic location of the computing device 102, date and time when the live preview image 106 is captured, can also be utilized to determine the recommended filter 316 and the filter parameters.

At block 408, the process 400 involves generating and presenting a user interface indicating that the context-aware image filtering is available. Similar to the disclosure regarding block 208, the image processing application 108 generates a contextual user interface control 134 to indicate the availability of the context-aware image filtering mode. The contextual interface control is configured to be actionable so that the user can press, click or otherwise select the contextual user interface control 134 to confirm to enable the context-aware image filtering mode.

At block 410, the process 400 involves determining if the image processing application 108 receives the confirmation of using the context-aware image filtering mode from the user. The confirmation can be received by the user selecting or activating the contextual user interface control 134. If the confirmation is not received, the process 400 involves, at block 412, accessing an updated live preview image 106 from the camera 104 to detect the subject of the image and determine the recommended filter as described above. As discussed above, at this stage, the image processing application 108 may be configured to access and process the live preview image 106 at a reduced rate to reduce the computational resource consumption of the context-aware image filtering. For instance, instead of processing every live preview image 106 captured by the camera 104, the image processing application 108 accesses and processes a live preview image for every N images captured by the camera 104. In one example, N takes the value of 10.

If it is determined at block 410 that the user has confirmed to use the context-aware image filtering mode, the process 400 involves, at block 414, automatically applying the recommended filter to the live preview image 106 to generate the filtered image 116. At block 416, the process 400 involves displaying the filtered image 116 in the display device 110. In addition, the image processing application 108 may also present the recommended filter, the applicable filters, and the available filters in the user interface so that the user can select a filter different from the recommended filter to be applied to the live preview image 106. In a further example, the user interface is also configured to present user interface controls to allow the user to adjust the parameters of a selected filter including the recommended filter 316. In response to the parameter adjustment by the user, the image processing application 108 updates the filtered image 116 by applying the selected filter using the adjusted parameters.

At block 418, the process 400 involves determining if a user input is received from the user interface. If no user input is received, the process involves accessing an updated live preview image 106 at block 420 and processing the updated live preview image 106 at block 422. Processing the updated live preview image 106 includes performing object tracking in the updated live preview image 106 if an object is detected in the previous live preview image 106. The object tracking allows the detected object to be identified in the updated live preview image 106 so that the recommended filter can be properly applied. In some implementations, accessing the updated live preview image 106 involved at block 420 is performed at a higher rate than block 412. In other words, the live preview images 106 captured by the camera 104 are sampled more frequently at block 420 than block 412 in order to ensure the performance of the object tracking and the filtering operation. As a result of the higher sampling rate, the filtered images 116 displayed in the user interface 112 have a higher visual quality and provide a smoother preview of the filtered image 116 to the user.

If, at block 418, it is determined that a user input is received, the process 400 involves different operations depending on the user input. If the user input specifies a new filter, the process 400 involves applying the specified new filter on the live preview image 106 at block 428. For example, the user can select a filter from the applicable filters or available filters from the user interface. In response to such a selection, the image processing application 108 applies the selected filter to the live preview image 106 to generate an updated filtered image to present in the user interface. If the user input includes parameter adjustment of the currently selected filter, the process 400 involves, at block 430, applying the existing filter with the newly adjusted parameters to the live preview image 106. For example, the user can change the filter length or the window size of a skin tone smoothing filter by operating on a user interface control, such as a slider, in the user interface. The image processing application 108 updates the filtered image 116 by applying the filter with the updated parameter to the live preview image 106. The filtered image generated in block 428 or block 430 is continuously updated through operations in blocks 420 and 422 as the user moves the camera 104. Specifically, the image processing application 108 keeps accessing updated live preview image 106 from the camera 104 and applies the selected filter with the selected parameter to generate an updated filtered image 116 for display in the user interface.

If the user input includes instructions to save the filtered image, the process 400 involves, at block 424, saving the filtered image 116 to a storage device of the computing device 102. If the user input includes instructions to cancel the operations, the process 400 involves exiting the context-aware image filtering mode and returning the computing device 102 to the initial stage where the no context-aware image filtering is applied. At that point, the image processing application 108 may access a new live preview image 106 from the camera 104 to start the process described above again.

FIGS. 5-8 depict examples of user interfaces 500-800 for context-aware image filtering, according to certain embodiments of the present disclosure. The user interface 500 depicts an example of the user interface 500 in the pre-context-aware image filtering mode when the context-aware image filtering is not available. In this example, the camera 104 was pointing at a scene where a lady was standing in front of a house. The live preview image 502 depicting that scene is shown in the user interface 500. This live preview image 502 shows a portion of the lady's face which is not sufficient to detect a face object. Other parts of the image 502, such as the ground, the tree, the car are also not large enough to enable the detection of an object or the determination of the subject of the image 502. As such, the image processing application 108 could not determine the subject of the image 502 and the camera 104 functions as normal. The user interface 500 further includes a save button 506 that the user can select to save the live preview image 502 to a storage device of the computing device 102. The user interface 500 further includes a filter icon that the user can select to manually choose a filter to apply to the currently displayed image 502.

The user interface 600 shown in FIG. 6 depicts an example of the user interface provided in the context-aware image filtering mode. In this example, the live preview image 602 shows the complete face of the lady, and thus the image processing application 108 is able to detect the face object and determines that the image 602 is in the category of face images. Based on the detected face object, the image processing application 108 is able to determine a recommended filter for the context-aware image filtering. As such, in this example, the image processing application 108 generates and presents a contextual user interface control 604 to indicate that the context-aware image filtering is available for this image. The user can thus select the contextual user interface control 604 to enter the context-aware image filtering mode to use the recommended filter.

The user interface 700 shown in FIG. 7 depicts an example of the user interface where the image processing application 108 enters the context-aware image filtering mode. In this example, the user interface 700 includes an indication 704 that a face is detected in the current live preview image. Further, the recommended filter, the "portrait" filter in this example, is automatically applied to the live preview image to generate a filtered image 702. In this example, the recommended filter is configured to smooth the skin tone of the detected face object and thus the freckles on the lady's face have been removed as shown in the filtered image 702.

The user interface 700 further includes a filter panel 706 to show a list of filters including the recommended filter, the applicable filters, and the available filters. In the example shown in user interface 700, each of the filters is indicated with a circle 708 along with text to show the name of the filter. The applicable filters are each marked with a badge 710 to distinguish them from the rest of the available filters. The recommended filter 712 is listed as the first filter in the filter panel 706. Further, the filter that is currently applied to the image 702 is presented differently from other filters, such as being shaded as shown in the example of user interface 700. The user interface 700 also includes a user interface control 714 which, when selected by the user, will cause the image processing application 108 to exit the context-aware image filtering mode and thus to disable the filter that has been applied to the live preview image.

The user interface 800 shown in FIG. 8 depicts an example of the user interface where the user selects a different filter than the recommended filter. In this example, the filter "Pop Art" is selected by the user and thus the filtered image 804 shown in the user interface 800 is filtered using the selected filter rather than the recommended filter "Portrait." The effect of this filter is illustrated by the dotted shade appearing in the sky area of the image 802. In any of the user interfaces 500-800, the user can select the user interface control 506 to save the image that is currently displayed in the user interface to a storage device of the computing device 102.

Figure 9:
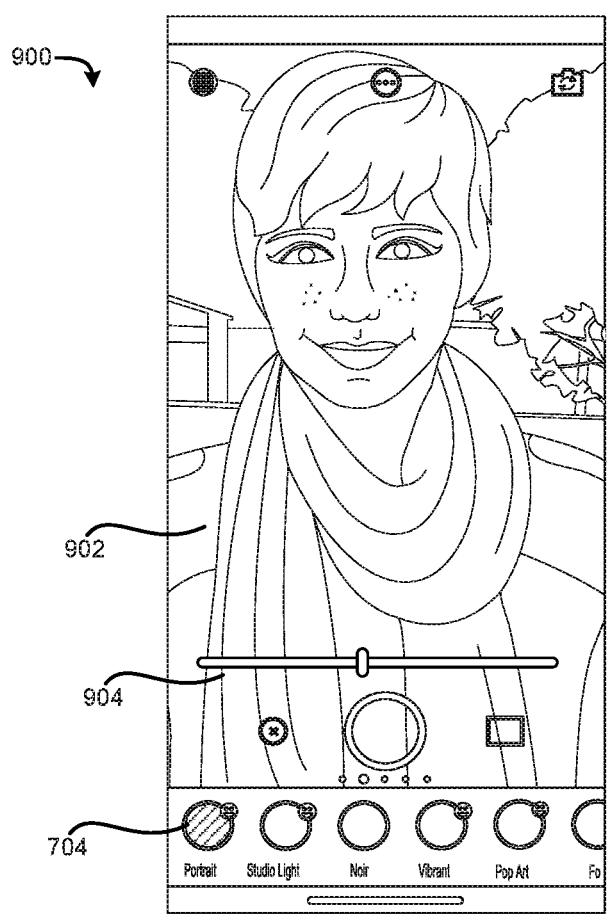
FIG. 9 depicts an example of a user interface for adjusting the parameters of the selected filter, according to certain embodiments of the present disclosure.

FIG. 9 depicts an example of a user interface 900 for adjusting the parameters of the selected filter, according to certain embodiments of the present disclosure. In the user interface 900, a slider 904 is presented which can be used to adjust the parameter value of the currently selected filter, including the recommended filter that is automatically selected by the image processing application 108. For example, slider 904 can represent the smoothing window size of the portrait filter that is configured to smooth the skin tone. The user can increase the value of the slider 904 to increase the size of the smoothing window of the portrait filter so that the skin tone is further smoothed, or decrease the value of the slider 904 to decrease the size of the smoothing window to have the skin tone less smoothed. Similar or different user interface controls can be presented to control various parameters of the selected filter. The user interface controls for adjusting the filter parameters can be invoked by the user activating a user interface control in the user interface 700 or 800, or be automatically displayed responsive to the image processing application 108 entering the context-aware image filtering mode or responsive to a different filter being selected by the user.

For illustrative purposes, the above examples describe that the list of applicable filters and the recommended filter are determined when the object or subject of the live preview image is determined. However, in other embodiments, these filters can also be determined at any other time, such as when the system is in the context-aware image filtering mode, i.e. the confirmation of using the context-aware image filtering mode is received from the user, e.g. by the user selecting the contextual user interface control.

While the above description focuses on applying the context-aware image filtering to live preview images from a camera, the context-aware image filtering can also be applied to saved images. For example, instead of accessing a live preview image 106 from the camera 104, the image processing application 108 may access a saved image 118 on the computing device 102 or a saved image on a remote server 130 that is accessible via the network 128. Similar to the process described above with respect to live preview images, the image processing application 108 may analyze the saved image to determine the subject of the image, such as by detecting an object in the image. Based on the subject of the image, the image processing application 108 classifies the image into an image category. A set of applicable filters can be determined for the image based on the image category. A recommended filter can be selected from the applicable filters and automatically applied to the saved image if the user confirms the use of the context-aware image filtering mode. The user interface 112 generated for the live preview images can be similarly generated and presented as described above except that the static saved image is displayed instead of the dynamic live preview image. This process can be repeated for each of the saved images to improve the perceptual quality of the existing saved images.

Computing System Example for Context-Aware Image Filtering

Figure 10:
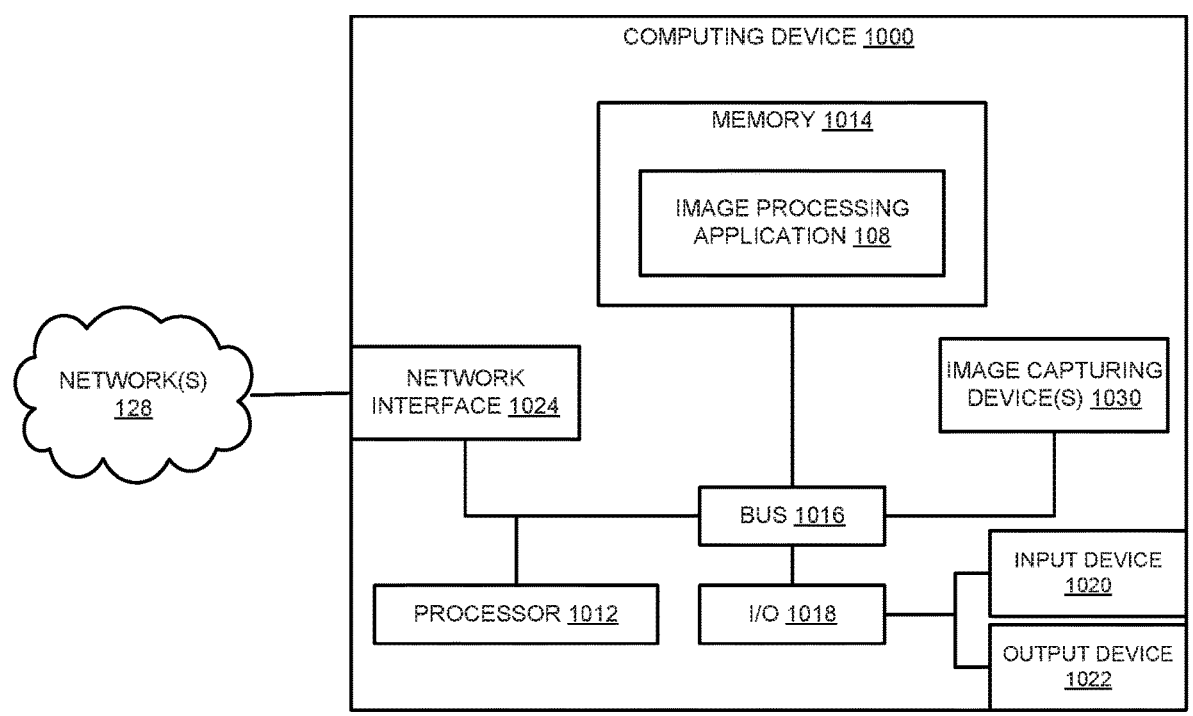
FIG. 10 depicts an example of a computing system that can be utilized to perform certain embodiments of the present disclosure.

Any suitable computing system can be used for performing the operations described herein. For example, FIG. 10 depicts an example of a computing device 1000 that can implement the computing device 102 of FIG. 1. In some embodiments, the computing device 1000 can include a processor 1012 that is communicatively coupled to a memory 1014 and that executes computer-executable program code and/or accesses information stored in the memory 1014. The processor 1012 may comprise a microprocessor, an application-specific integrated circuit ("ASIC"), a state machine, or other processing device. The processor 1012 can include any of a number of processing devices, including one. Such a processor can include or may be in communication with a computer-readable medium storing instructions that, when executed by the processor 1012, cause the processor to perform the operations described herein.

The memory 1014 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1000 can also include a bus 1016. The bus 1016 can communicatively couple one or more components of the computing device 1000. The computing device 1000 can also include a number of external or internal devices such as input or output devices. For example, the computing device 1000 is shown with an input/output ("I/O") interface 1018 that can receive input from one or more input devices 1020 or provide output to one or more output devices 1022. The one or more input devices 1020 and one or more output devices 1022 can be communicatively coupled to the I/O interface 1018. The communicative coupling can be implemented via any suitable manner (e.g., a connection via a printed circuit board, connection via a cable, communication via wireless transmissions, etc.). Non-limiting examples of input devices 1020 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 1022 include an LCD screen, an external monitor, a speaker, or any other device that can be used to display or otherwise present outputs generated by a computing device.

The computing device 1000 can execute program code that configures the processor 1012 to perform one or more of the operations described above with respect to FIGS. 1-9. The program code can include the image processing application 108. The program code may be resident in the memory 1014 or any suitable computer-readable medium and may be executed by the processor 1012 or any other suitable processor.

The computing device 1000 can also include at least one network interface device 1024. The network interface device 1024 can include any device or group of devices suitable for establishing a wired or wireless data connection to one or more data networks 128. Non-limiting examples of the network interface device 1024 include an Ethernet network adapter, a modem, and/or the like. The computing device 1000 can transmit messages as electronic or optical signals via the network interface device 1024.

The computing device 1000 can also include one or more image capturing device(s) 1030, such as a camera 104 or other imaging device that is capable of capturing a photographic or video image. The image capturing device(s) 1030 can be configured to capture still images and/or video. The image capturing device(s) 1030 may utilize a charge coupled device ("CCD") or a complementary metal oxide semiconductor ("CMOS") image sensor to capture images. In some configurations, the image capturing device(s) 1030 include a flash to aid in taking pictures in low-light environments. Settings for the image capturing device(s) 1030 may be implemented as hardware or software buttons.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code that is stored thereon, the program code executable by a processing device for performing operations comprising:
for every set of N images that are in a field of view of a camera associated with the processing device, wherein N is an integer greater than one,
detecting an object in only an image subset of the N images by applying an object detection technique on a down-sampled version of the image subset, wherein a number of images in the image subset is less than N;
determining, based on the object detected in the image subset, a recommended filter for the image subset from a list of filters available for filtering the image subset;
causing a display device to display, prior to presenting the recommended filter, a user interface comprising a contextual user interface control, the contextual user interface control indicating that a context-aware image filtering mode is available; and
in response to receiving a selection of the contextual user interface control, enabling the context-aware image filtering mode by:
automatically applying the object detection technique to a live preview image that is currently in the field of view of the camera to detect the object,
automatically applying the recommended filter to the live preview image to generate a filtered image and causing the display device to display the filtered image in place of the live preview image,
automatically applying an object tracking technique to track the object in a second live preview image that is in the field of view of the camera subsequent to the live preview image, and
automatically applying the recommended filter to the second live preview image to generate a filtered image of the second live preview image and causing the display device to display the filtered image of the second live preview image.

2. The non-transitory computer-readable medium of claim 1, wherein the operations further comprise:
determining, from the list of filters, a plurality of filters that are applicable to the live preview image based on the object detected in the live preview image, the plurality of filters comprising the recommended filter;
causing the plurality of filters to be presented in the user interface along with the recommended filter;
receiving a selection of a second filter from the plurality of filters that is different from the recommended filter; and
in response to receiving the selection of the second filter, filtering the live preview image using the second filter to generate a second filtered image and causing the display device to display the second filtered image.

3. The non-transitory computer-readable medium of claim 2, wherein the operations further comprise determining a category of the live preview image based on the detected object, wherein the plurality of filters are determined based on the category of the live preview image.

4. The non-transitory computer-readable medium of claim 2, wherein the plurality of filters comprise a 3D filter configured for inserting a 3D object into an input image to generate a combined image.

5. The non-transitory computer-readable medium of claim 1, wherein the recommended filter is determined based on a user profile associated with a user of the processing device, the user profile specifying a history of filters selected by the user when filtering images.

6. The non-transitory computer-readable medium of claim 5, wherein the recommended filter is further determined based on one or more of a geographic location of the camera, a current date, or a current time.

7. The non-transitory computer-readable medium of claim 1, wherein the operations further comprise:
receiving an updated image that is currently in the field of view of the camera;
generating an updated filtered image by applying the recommended filter to the updated image;
updating the filtered image displayed on the display device with the updated filtered image; and
saving, responsive to a user input request that the filtered image be saved, the filtered image to a storage device.

8. The non-transitory computer-readable medium of claim 1, wherein detecting the object in the live preview image comprises detecting a face in the live preview image.

9. An apparatus comprising:
a camera configured for capturing images that are in a field of view of the camera;
a display device coupled to the camera and configured for displaying the image;
a processing device coupled to the camera and the display device; and
a non-transitory computer-readable medium communicatively coupled to the processing device, wherein the processing device is configured to execute program code stored in the non-transitory computer-readable medium and thereby perform operations comprising:
for every set of N images that are in the field of view of the camera, wherein N is an integer greater than one,
detecting a subject in only an image subset of the N images by applying a subject detection technique on a down-sampled version of the image subset, wherein a number of images in the image subset is less than N;
determining, based on the subject detected in the image subset, a recommended filter for the image subset from a list of filters available for filtering the image subset;
causing the display device to display, prior to presenting the recommended filter, a user interface comprising a contextual user interface control, the contextual user interface control indicating that a context-aware image filtering mode is available; and
in response to receiving a selection of the contextual user interface control, enabling the context-aware image filtering mode by:
automatically applying the subject detection technique to a live preview image that is currently in the field of view of the camera to detect the subject,
automatically applying the recommended filter to the live preview image to generate a filtered image and causing the display device to display the filtered image in place of the live preview image, automatically applying a tracking technique to track the subject in a second live preview image that is in the field of view of the camera subsequent to the live preview image, and automatically applying the recommended filter to the second live preview image to generate a filtered image of the second live preview image and causing the display device to display the filtered image of the second live preview image.

10. The apparatus of claim 9, wherein the operations further comprise:

determining, from the list of filters, a plurality of filters that are applicable to the live preview image based on the subject detected in the live preview image, the plurality of filters comprising the recommended filter;

causing the plurality of filters to be presented in the user interface along with the recommended filter;

receiving a selection of a second filter from the plurality of filters that is different from the recommended filter; and in response to receiving the selection of the second filter, filtering the live preview image using the second filter to generate a second filter image and causing the display device to display the second filtered image.

11. The apparatus of claim 9, wherein the operations further comprise:

causing the display device to display a second user interface control in the user interface, the second user interface control configured for adjusting a parameter of the recommended filter;

reapplying, responsive to receiving a selection of the second user interface control, the recommended filter to the live preview image to generate an updated filtered image by changing the parameter of the recommended filter to a value specified by the selection of the second user interface control; and causing the display device to display the updated filtered image.

12. The apparatus of claim 9, wherein detecting the subject in the live preview image comprises detecting a human face in the live preview image.

13. The apparatus of claim 9, wherein detecting the subject in the live preview image comprises detecting food in the live preview image, and wherein the recommended filter is determined based on a color of the detected food.

14. The apparatus of claim 9, where detecting the subject in the live preview image comprises:

detecting a plurality of objects in the live preview image;

determining a size of each of the plurality of objects in the live preview image;

comparing the size of each of the plurality of objects with a respective threshold value; and determining the subject of the live preview image based on an object whose size being higher than the respective threshold value.

15. A computer-implemented method in which a processing device performs operations comprising:

for every set of N images that are in a field of view of a camera associated with the processing device, wherein N is an integer greater than one, detecting a subject in only an image subset of the N images by applying a subject detection technique on a down-sampled version of the image subset, wherein a number of images in the image subset is less than N;

determining, based on the subject detected in the image subset, a recommended filter for the image subset;

causing a display device to display, prior to presenting the recommended filter, a user interface comprising a contextual user interface control, the contextual user interface control indicating that a context-aware image filtering mode is available; and in response to receiving a selection of the contextual user interface control, enabling the context-aware image filtering mode by:

automatically applying the subject detection technique to a live preview image that is currently in the field of view of the camera to detect the subject, automatically applying the recommended filter to the live preview image to generate a filtered image and causing the display device to present the filtered image in place of the live preview image, automatically applying a tracking technique to track the subject in a second live preview image that is in the field of view of the camera subsequent to the live preview image, and automatically applying the recommended filter to the second live preview image to generate a filtered image of the second live preview image and causing the display device to display the filtered image of the second live preview image.

16. The computer-implemented method of claim 15, the operations further comprising;

receiving an updated live image that is currently in the field of view of the camera;

generating an updated filtered image by applying the recommended filter to the updated live image; and updating the filtered image displayed on the display device with the updated filtered image.

17. The computer-implemented method of claim 15, wherein the operations further comprise:

determining a plurality of filters that are applicable to the live preview image, the plurality of filters comprising the recommended filter;

causing the plurality of filters to be presented in the user interface along with the recommended filter;

receiving a selection of a second filter that is different from the recommended filter from the plurality of filters; and in response to receiving the selection of the second filter, filtering the live preview image using the second filter to generate a second filter image and causing the display device to display the second filtered image.

18. The computer-implemented method of claim 17, wherein the operations further comprise determining a category of the live preview image, wherein the plurality of filters are determined based on the category of the live preview image.

* * * * *